(12) United States Patent
Moffat et al.

(10) Patent No.: US 9,742,564 B2
(45) Date of Patent: *Aug. 22, 2017

(54) METHOD AND SYSTEM FOR ENCRYPTING DATA

(75) Inventors: Darren J. Moffat, Lower Earley (GB); Jeffrey S. Bonwick, Los Altos, CA (US); William H. Moore, Fremont, CA (US); Matthew A. Ahrens, San Francisco, CA (US); Mark J. Maybee, Boulder, CO (US); George Wilson, Brisbane, CA (US); Neil V. Perrin, Westminster, CO (US)

(73) Assignee: Oracle International Corporation, Redwood City, CA (US)

( * ) Notice: Subject to any disclaimer, the term of this patent is extended or adjusted under 35 U.S.C. 154(b) by 900 days.

This patent is subject to a terminal disclaimer.

(21) Appl. No.: 12/780,204

(22) Filed: May 14, 2010

(65) Prior Publication Data

US 2011/0283113 A1 Nov. 17, 2011

(51) Int. Cl.
*H04L 29/06* (2006.01)
*H04L 9/08* (2006.01)
*G06F 21/60* (2013.01)
*H04L 9/14* (2006.01)

(52) U.S. Cl.
CPC .......... *H04L 9/0894* (2013.01); *G06F 21/602* (2013.01); *H04L 9/14* (2013.01)

(58) Field of Classification Search
CPC .......... G06F 21/602; G06F 2221/2107; G06F 21/6218; H04L 9/0822; H04L 9/0894; H04L 9/14

USPC .......................................................... 713/189
See application file for complete search history.

(56) References Cited

U.S. PATENT DOCUMENTS

| | | | |
|---|---|---|---|
| 5,819,292 A | 10/1998 | Hitz et al. | |
| 7,152,165 B1 * | 12/2006 | Maheshwari et al. | ........ 713/193 |
| 7,865,741 B1 | 1/2011 | Wood et al. | |
| 2004/0151323 A1 * | 8/2004 | Olkin | ................... G06Q 20/401 380/280 |
| 2007/0005894 A1 * | 1/2007 | Dodge | .......................... 711/118 |
| 2007/0079098 A1 | 4/2007 | Kitamura | |
| 2007/0113157 A1 | 5/2007 | Perego | |
| 2008/0294906 A1 | 11/2008 | Chang et al. | |
| 2009/0323940 A1 | 12/2009 | Moffat et al. | |
| 2010/0217970 A1 | 8/2010 | Carter et al. | |

OTHER PUBLICATIONS

Darren J Moffat, "ZFS Encryption Project", http://www.opensolaris.org/os/project/zfs-crypto/files/zfs-crypto-design.pdf Publication date: Jan. 27, 2008.*

(Continued)

*Primary Examiner* — Yogesh Paliwal
(74) *Attorney, Agent, or Firm* — Brooks Kushman P.C.

(57) ABSTRACT

A processing device may generate a data encryption key configured to encrypt unique data within a clone of an encrypted data set and associated with a set of transaction identifiers of a transaction based file system. The processing device may further wrap the data encryption key with a wrapping key, create a cloned encrypted data set with the data encryption key, and store the wrapped data encryption key with the cloned encrypted data set indexed by at least one of the set of transaction identifiers.

16 Claims, 2 Drawing Sheets

(56) References Cited

OTHER PUBLICATIONS

Darren Moffat "ZFS Crypto Update", https://blogs.oracle.com/darren/entry/zfs_crypto_update1, Publication: Apr 3, 2009.*
http://en.wikipedia.org/wiki/Write_Anywhere_File_Layout; pp. 1-2, May 22, 2008.
Darren J. Moffat, ZFS Encryption Project, Feb. 7, 2007, 8 Pages.

* cited by examiner

METHOD AND SYSTEM FOR ENCRYPTING DATA

BACKGROUND

Copy-on-write (COW) is an optimization strategy used in computer programming. Multiple requestors of resources that are initially indistinguishable are given pointers to the same resource. This strategy is maintained until a requestor attempts to modify its copy of the resource. A private copy is then created to prevent any changes from becoming visible to the other requestors. The creation of such private copies is transparent to the requestors. No private copy is created if a requestor does not attempt to modify its copy of the resource.

Virtual memory operating systems may use COW. If a process creates a copy of itself, pages in memory that may be modified by the process (or its copy) are marked COW. If one process modifies the memory, the operating system's kernel may intercept the operation and copy the memory so that changes in one process's memory are not visible to the other.

COW may also be used in the calloc function provided in the C and C++ standard libraries for performing dynamic memory allocation. A page of physical memory, for example, may be filled with zeroes. If the memory is allocated, the pages returned may all refer to the page of zeroes and may be marked as COW. As such, the amount of physical memory allocated for a process does not increase until data is written.

A memory management unit (MMU) may be instructed to treat certain pages in an address space of a process as read-only in order to implement COW. If data is written to these pages, the MMU may raise an exception to be handled by a kernel. The kernel may then allocate new space in physical memory and make the page being written correspond to that new location in physical memory.

COW may permit efficient use of memory. Physical memory usage only increases as data is stored in it. Hash tables may be implemented that use little more physical memory than is necessary to store the objects they contain. Such programs, however, may run out of virtual address space because virtual pages unused by the hash table cannot be used by other parts of the program.

Outside a kernel, COW may be used in library, application and system code. For example, the string class provided by the C++ standard library allows COW implementations. COW may also be used in virtualization/emulation software such as Bochs, QEMU and UML for virtual disk storage. This may (i) reduce required disk space as multiple virtual machines (VMs) may be based on the same hard disk image and (ii) increase performance as disk reads may be cached in RAM and subsequent reads served to other VMs outside of the cache.

COW may be used in the maintenance of instant snapshots on database servers. Instant snapshots preserve a static view of a database by storing a pre-modification copy of data when underlying data are updated. Instant snapshots are used for testing or moment-dependent reports and are not generally used to replace backups. COW may also be used as the underlying mechanism for snapshots provided by logical volume management.

COW may be used to emulate a read-write storage on media that require wear leveling or are physically Write Once Read Many.

SUMMARY

A method for making data in a data set inaccessible may include generating a data encryption key (i) configured to encrypt data within a data set of a transaction based file system and (ii) associated with a set of transaction identifiers of the file system, wrapping the data encryption key with a wrapping key, and creating an encrypted data set with the data encryption key. The method may further include storing the wrapped data encryption key with the encrypted data set indexed by at least one of the set of transaction identifiers, receiving a command to delete the encrypted data set, and altering or changing the wrapping key in response to the command to make data in the encrypted data set inaccessible.

A computer processing system may include at least one processing device configured to generate a data encryption key (i) configured to encrypt unique data within a clone of an encrypted data set and (ii) associated with a set of transaction identifiers of a transaction based file system. The at least one processing device may be further configured to wrap the data encryption key with a wrapping key, to create a cloned encrypted data set with the data encryption key, and to store the wrapped data encryption key with the cloned encrypted data set indexed by at least one of the set of transaction identifiers.

A computer-readable storage medium may have information stored thereon for directing one or more computers to generate a data encryption key configured to encrypt data within a data set of a transaction based file system and associated with a set of transaction identifiers of the file system, to wrap the data encryption key with a wrapping key, to create an encrypted data set with the data encryption key, and to store the wrapped data encryption key with the encrypted data set indexed by at least one of the set of transaction identifiers. The computer-readable storage medium may further have information stored thereon for directing the one or more computers to generate another data encryption key configured to encrypt unique data within a clone of the encrypted data set and associated with another set of transaction identifiers of the transaction based file system, to wrap the another data encryption key with another wrapping key, to create a cloned encrypted data set with the another data encryption key, and to store the wrapped another data encryption key with the cloned encrypted data set indexed by at least one of the another set of transaction identifiers.

DETAILED DESCRIPTION

Figure 1:
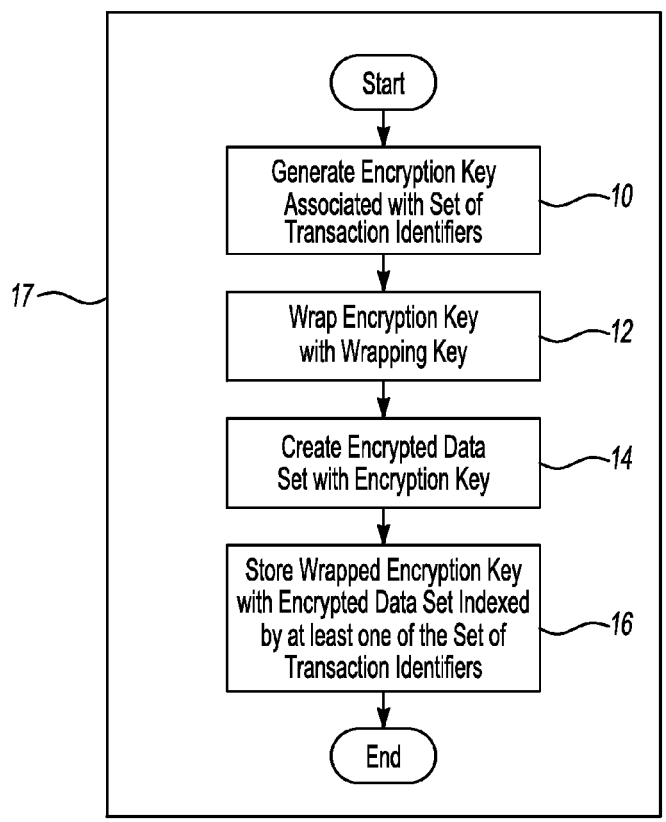
FIGS. 1-4 are flow charts depicting example algorithms for manipulating data of a copy-on-write file system.

ZFS is a file system for the Solaris Operating System. The features of ZFS include support for high storage capacity, integration of the concepts of file system and volume management, snapshots and copy-on-write (COW) clones, on-line integrity checking and repair, and RAID-Z.

Unlike traditional file systems, which may reside on single devices and thus require a volume manager to use more than one device, ZFS file systems are built on top of virtual storage pools referred to as zpools. A zpool is constructed of virtual devices (vdevs), which are themselves constructed of block devices: files, hard drive partitions or entire drives.

Block devices within a vdev may be configured in different ways, depending on needs and space available: non-redundantly (similar to RAID 0), as a mirror (RAID 1) of two or more devices, as a RAID-Z group of three or more devices, or as a RAID-Z2 group of four or more devices. The storage capacity of all vdevs is available to all of the file system instances in the zpool.

A quota may be set to limit the amount of space a file system instance can occupy and a reservation can be set to guarantee that space will be available to a file system instance.

ZFS uses a COW transactional object model. All block pointers within the file system contain a 256-bit checksum of the target block which is verified when the block is read. Blocks containing active data are not overwritten in place. Instead, a new block is allocated, modified data is written to it and then any metadata blocks referencing it are similarly read, reallocated and written. To reduce the overhead of this process, multiple updates are grouped into transaction groups. An intent log is used when synchronous write semantics are required.

If ZFS writes new data, the blocks containing the old data may be retained, allowing a snapshot version of the file system to be maintained. ZFS snapshots are created quickly, since all the data composing the snapshot is already stored. They are also space efficient, since any unchanged data is shared among the file system and its snapshots.

Writeable snapshots ("clones") may also be created, resulting in two independent file systems that share a set of blocks. As changes are made to any of the clone file systems, new data blocks are created to reflect those changes. Any unchanged blocks continue to be shared, no matter how many clones exist.

ZFS employs dynamic striping across all devices to maximize throughput. As additional devices are added to the zpool, the stripe width automatically expands to include them. Thus, all disks in a pool are used which balances the write load across them.

ZFS uses variable-sized blocks of up to 128 kilobytes. Currently available code allows an administrator to tune the maximum block size used as certain workloads do not perform well with large blocks.

If data compression is enabled, variable block sizes are used. If a block can be compressed to fit into a smaller block size, the smaller size is used on the disk to use less storage and improve IO throughput (though at the cost of increased CPU use for the compression and decompression operations).

In ZFS, file system manipulation within a storage pool may be easier than volume manipulation within a traditional file system. For example, the time and effort required to create or resize a ZFS file system is closer to that of making a new directory than it is to volume manipulation in some other systems.

Pools and their associated ZFS file systems may be moved between different platform architectures, including systems implementing different byte orders. The ZFS block pointer format stores file system metadata in an endian-adaptive way. Individual metadata blocks are written with the native byte order of the system writing the block. If the stored endianness does not match the endianness of the system when reading, the metadata is byte-swapped in memory. This does not affect the stored data itself. As is usual in POSIX systems, files appear to applications as simple arrays of bytes, so applications creating and reading data remain responsible for doing so in a way independent of the underlying system's endianness.

Secure deletion of data by encrypting the data and destroying the key is a known best practice and is recommended and authorized by the National Institute of Standards and Technology (NIST). In a pooled storage system, such as ZFS, it may be desirable to securely delete only sets of data rather than all of the data on a disk, whether physical or virtual. Achieving secure data deletion in pooled storage systems, however, may be difficult for several reasons: drives may contain information that is no longer online because of drive unavailability; scrubbing data off drives may be time consuming and may require destruction of all of the data on the drive or intimate knowledge of the implementation of the file system to delete only fragments of it; freed space may need to be scrubbed; and, original data that has been re-mapped by the drive may be overwritten by subsequent write operations.

Encryption support may be added to COW file systems, such as the ZFS storage system, thus allowing the encryption algorithm suite and key to be specified on a per dataset basis. In these instances, the data encryption keys managed by an administrator or end user are not used directly but instead used as wrapping keys. The wrapping key may be used to protect the encryption keys for many different datasets. Secure deletion of a dataset may be achieved in a pooled storage system with encryption, such as that implemented for ZFS, by performing a normal dataset "destroy." As apparent to those of ordinary skill, this operation does not overwrite any data on disk but rather moves the blocks to a free list. The "destroy" operation may then be followed by a change of the wrapping key that was in use for that data set.

NIST guidelines recommend that wrapping keys be changed periodically and that data encryption keys be used to encrypt data only for a limited period of time (e.g., two years for Advanced Encryption Standard (AES) keys). Most encrypted file systems, however, do not support multiple active data encryption keys or permit the change of data encryption keys without decrypting and re-encrypting all data, which may involve downtime for the file system and/or double the available storage.

Embodiments described herein implement algorithms that permit change to data encryption keys, for example, at an arbitrary time defined by a user and/or at the time clone file systems are created. Certain of these algorithms may require a transactional file system that stores the transaction group identifier for any given block it was written in. Certain of these algorithms may also require a small amount of file system metadata space to store a table of wrapped data encryption keys indexed by the transaction group identifier (referred to as the keychain below).

To create a new data encryption key, for example, a new transaction may be created that only updates the key table. No "application" or other file system data or metadata may be created or modified in this transaction. A new randomly generated data encryption key may then be created and wrapped with a wrapping key. The wrapped key may be stored in the keychain and the transaction committed. The index for the keychain may be the transaction group identifier for the transaction it is being written in.

When a file system is made available (i.e., its wrapping key is presented), the keychain entries may be decrypted and stored in memory. The in memory presentation can be done using various data structures but for efficient searching, an AVL tree may be used. This enables relatively quick identification of the correct key in the in memory keychain when it is needed to decrypt a disk block and the transaction group it was written in is known.

For reading (decrypting) blocks, the only time an exact match may be found for the disk block transaction group and the keychain index is for the first key in the keychain (i.e., the one created when the file system was created). The maximum transaction group key that is less than the transaction group ID or the block being read should be found for all other cases. The use of an AVL tree for the in memory organization may make this efficient, but a linked list, etc., may also be used.

For writing disk blocks, the highest numbered entry in the keychain should be used because that is the most recent data encryption key.

Certain implementations may require that a transaction group be created that contains only the updates to the keychain itself and guarantees that no other rights can happen in the same transaction. In the ZFS implementation, this may be accomplished by using a data set sync task group. Similar techniques may be employed in other transaction-based file systems.

For clone file systems, the option to create a new data encryption key for data unique to the clone may use the same techniques described above except that the new key may be created and written to the keychain in the same transaction group that the clone is created in. This is safe because no data can be written in the transaction group in the ZFS implementation. This, however, may not be the case in other transaction based file systems that support clones (or writable snapshots).

Using the transaction group as an index into a wrapped list (keychain) of data encryption keys rather than a wrapped single data encryption key allows compliance with NIST guidelines on the total amount of time a key is used to encrypt data without any data having to be re-encrypted with a new key. As a result, the file system may be online at full operating potential during the rekeying operation. It also allows for old keys to be removed from the keychain when all blocks written using that key are no longer referenced to enhance security.

Referring now to FIG. 1, an encryption key associated with a set of transaction identifiers is generated at operation 10. For example, using a system random number generator or dedicated hardware key generation system, an encryption key of suitable length is created. This encryption may be used to encrypt and/or decrypt all blocks written within the set of transactions for which it has been identified. Some ZFS implementations may support AES keys with lengths of 128 bit and 256 bit, but may be extended for other algorithms and key lengths. The set of transactions identifiers, in certain embodiments, may be a monotonically increasing set of transaction identifiers.

At operation 12, the encryption key is wrapped with a wrapping key. For example, the encryption key may be wrapped by encrypting it with another key using AES in Counter with CBC-MAC (CCM) mode. This may provide both confidentiality and a cryptographic strength integrity check that this is the correct key. The wrapping operation may be in-place: to use the data encryption key, it must first be unwrapped. Alternatively, the wrapping operation may leave the original unwrapped form of the key untouched. A copy of the original data encryption key may also be created.

At operation 14, an encrypted data set is created with the encryption key. For example, a set of blocks from a storage pool may be used to create a new data set. File system data and metadata, such as filenames, timestamps, permissions, etc., may be encrypted using the encryption key before being written to disk. All future blocks allocated for this data set may be encrypted with the encryption key until a new key is generated for this dataset in a future transaction. At this time, the new key may be used to encrypt future blocks.

In this embodiment, the encryption key value (or the reference thereto) is assumed to be available. In other embodiments, the wrapped encryption key must first be unwrapped before encrypting the data set. In still other embodiments, the encrypted data set may be created before the encryption key is wrapped. Other configurations are also possible.

At operation 16, the wrapped encryption key is stored with the encrypted data set and indexed by at least one of the set of transaction identifiers. For example, an unencrypted property area of the data set may be used to store the wrapped encryption key. In certain ZFS implementations, this may be stored alongside properties for compression, checksum, network sharing, etc.

As apparent to those of ordinary skill, the algorithms disclosed herein may be deliverable to a processing device, such as computer/processor/computer processing system 17, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), state machines, controllers or other hardware components or devices, or a combination of hardware, software and firmware components.

Figure 2:
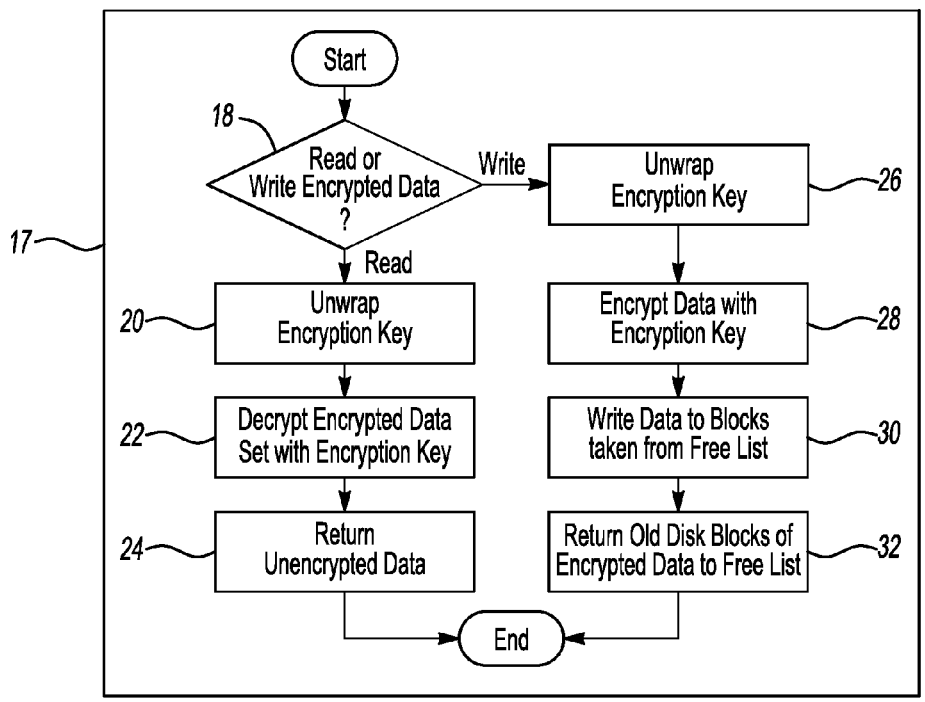

Referring now to FIG. 2, it is determined whether a read or write operation is to be performed on the encrypted data discussed with reference to FIG. 1 at operation 18 based on, for example, input from a user.

If a read is to be performed, the appropriate key is selected from the indexed list of data set keys based on the transaction the block was written in (as described above) and is unwrapped, e.g., unencrypted, at operation 20. At operation 22, the encrypted data set is decrypted with the encryption key. At operation 24, the unencrypted data is returned, for example, to the user.

If a write is to be performed, the most recent transaction indexed key from the list for this data set is selected (as described above) and is unwrapped at operation 26. At operation 28, data to be written is encrypted with the encryption key. At operation 30, the encrypted data is written to data blocks taken, for example, from a free list. At operation 32, old disk blocks of encrypted data are returned to the free list.

Figure 3:
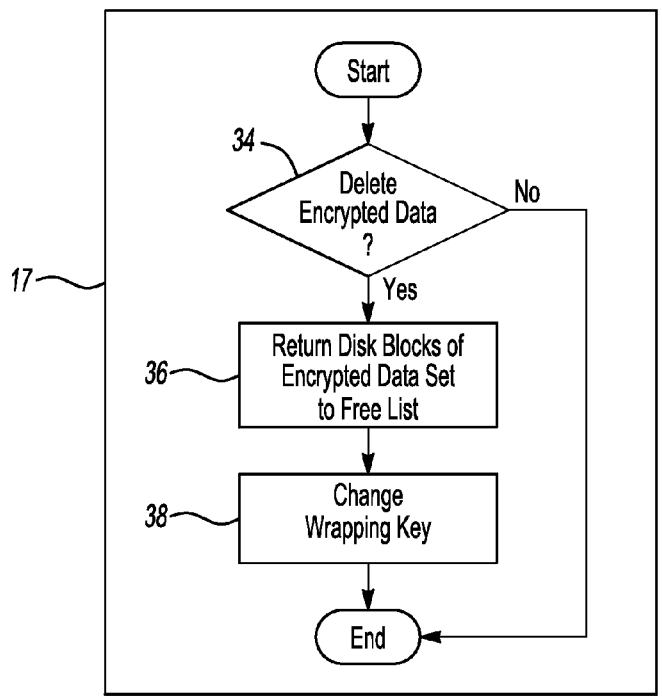

Referring now to FIG. 3, it is determined whether to delete the encrypted data set at operation 34 based on, for example, input, such as a delete command, from the user.

If yes, disk blocks defining the encrypted data set are returned to the free list at operation 36. For example, blocks allocated from the COW storage pool for the encrypted data set to be deleted may be returned to the free list. The data set may then be removed from the list of active/known data sets.

At operation 38, the wrapping key is altered to make information in the encrypted data set inaccessible. For example, a key change operation on the wrapping key may be performed. This may involve decrypting encryption keys for all currently active data sets (the data set "deleted" at operation 36, however, is not included) and wrapping all the encryption keys associated with currently active data sets with a different and/or altered wrapping key. This ensures that the encryption keys associated with those data sets that have been "deleted" can no longer be unwrapped (decrypted) using the new wrapping key.

Figure 4:
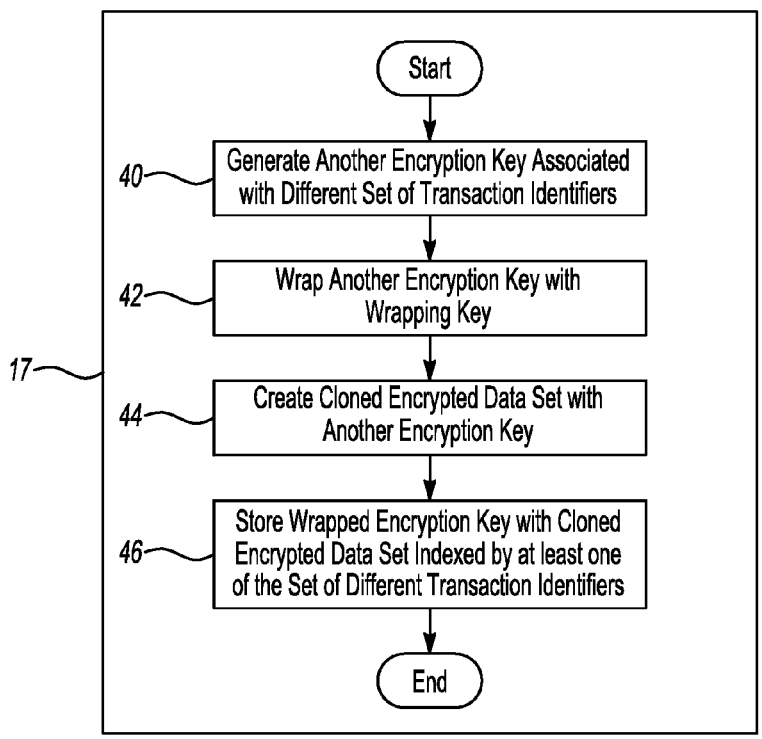

Referring now to FIG. 4, another encryption key associated with a different set of transaction identifiers (different from the set of transaction identifiers discussed with reference to operation 10 of FIG. 1) is generated at operation 40. This encryption key may be used to encrypt unique (or different) data within a clone (or writable snapshot) of the encrypted data set created at operation 14 of FIG. 1. That is, this encryption key will be used to encrypt new blocks of data that are unique to this clone. The cloned data set may have a copy of (or reference to) the set of transaction indexed keys in existence at the time the clone was created. These keys may be used to read data that is shared (not unique) with the original data set from which the clone was created. This clone may not have a copy of (or reference to) any new keys created in the original data set after the time the clone was created. Therefore, the data unique to the clone can be securely deleted independently of the original data set using the methods described at operations 34 through 38.

At operation 42, the another data encryption key is wrapped with a wrapping key. At operation 44, a cloned encrypted data set is created with the another data encryption key. At operation 46, the wrapped another data encryption key is stored with the cloned encrypted data set indexed by at least one of the different set of transaction identifiers. (In certain embodiments, however, encryption keys from the original data set may be copied to the clone after operation 44.)

The cloned encrypted data set may then be read to, written from, and/or deleted in a manner similar to that described with reference to FIGS. 2 and 3.

While certain embodiments have been described with reference to a COW file system (e.g., ZFS), such is not required or assumed. Other pooled and/or COW implementations are also possible. Furthermore, while embodiments of the invention have been illustrated and described, it is not intended that these embodiments illustrate and describe all possible forms of the invention. In certain embodiments for example, keys may not be unwrapped on every read or write. They may instead be held in memory (e.g., in an AVL tree indexed by dataset object ID, which in that structure is an AVL tree indexed by transaction ID) in the unwrapped form together with the wrapping key. Other arrangements and scenarios are also possible.

The words used in the specification are words of description rather than limitation, and it is understood that various changes may be made without departing from the spirit and scope of the invention.

What is claimed:

1. A method for making data in a data set inaccessible comprising:
    generating a data encryption key (i) configured to encrypt data within a data set of a copy-on-write transaction based file system and (ii) associated with a set of monotonically increasing transaction identifiers, each indicating when a corresponding block of data was written at a particular location, of the copy-on-write transaction based file system;
    wrapping the data encryption key with a wrapping key;
    creating an encrypted data set with the data encryption key;
    storing the wrapped data encryption key with the encrypted data set indexed by at least one of the set of monotonically increasing transaction identifiers;
    receiving a command to delete the encrypted data set; and
    altering or changing the wrapping key in response to the command to make data in the encrypted data set inaccessible.

2. The method of claim 1 further comprising generating another data encryption key (i) configured to encrypt unique data within a clone of the encrypted data set and (ii) associated with another set of transaction identifiers of the copy-on-write transaction based file system.

3. The method of claim 2 further comprising wrapping the another data encryption key with a wrapping key.

4. The method of claim 3 further comprising creating a cloned encrypted data set with the another data encryption key.

5. The method of claim 4 further comprising storing the wrapped another data encryption key with the cloned encrypted data set indexed by at least one of the another set of transaction identifiers.

6. The method of claim 1 wherein wrapping the data encryption key with a wrapping key includes encrypting the data encryption key with another key using Advanced Encryption Standard (AES) in Counter with CBC-MAC (CCM) mode.

7. A computer processing system comprising:
    at least one processing device to (i) generate a data encryption key (a) configured to encrypt unique data within a clone of an encrypted data set and (b) associated with a set of monotonically increasing transaction identifiers, each indicating when a corresponding block of data was written at a particular location, of a copy-on-write transaction based file system, (ii) wrap the data encryption key with a wrapping key, (iii) create a cloned encrypted data set with the data encryption key, and (iv) store the wrapped data encryption key with the cloned encrypted data set indexed by at least one of the set of monotonically increasing transaction identifiers.

8. The system of claim 7 wherein the at least one processing device is further programmed to receive a command to delete the cloned encrypted data set and to alter or change the wrapping key in response to the command to make data in the cloned encrypted data set inaccessible.

9. The system of claim 7 wherein the at least one processing device is further programmed to wrap the data encryption key with a wrapping key by encrypting the data encryption key with another key using Advanced Encryption Standard (AES) in Counter with CBC-MAC (CCM) mode.

10. The system of claim 7 wherein the copy-on-write transaction based file system is Z file system (ZFS).

11. A non-transitory computer-readable storage medium having information stored thereon for directing one or more computers to
    generate a data encryption key configured to encrypt data within a data set of a copy-on-write transaction based file system and associated with a set of monotonically increasing transaction identifiers, each indicating when a corresponding block of data was written at a particular location, of the copy-on-write transaction based file system,
    wrap the data encryption key with a wrapping key,
    create an encrypted data set with the data encryption key,
    store the wrapped data encryption key with the encrypted data set indexed by at least one of the set of monotonically increasing transaction identifiers,
    generate another data encryption key configured to encrypt unique data within a clone of the encrypted data set and associated with another set of transaction identifiers of the copy-on-write transaction based file system, wrap the another data encryption key with another wrapping key, create a cloned encrypted data set with the another data encryption key, and store the wrapped another data encryption key with the cloned encrypted data set indexed by at least one of the another set of transaction identifiers.

12. The non-transitory computer-readable storage medium of claim 11 wherein the information stored thereon further directs the one or more computers to receive a command to delete the encrypted data set and to alter or change the wrapping key in response to the command to make data in the encrypted data set inaccessible.

13. The non-transitory computer-readable storage medium of claim 11 wherein the information stored thereon further directs the one or more computers to receive a command to delete the cloned encrypted data set and to alter or change the another wrapping key in response to the command to make data in the cloned encrypted data set inaccessible.

14. The non-transitory computer-readable storage medium of claim 11 wherein the wrapping key and another wrapping key are different.

15. The non-transitory computer-readable storage medium of claim 11 wherein the copy-on-write transaction based file system is Z file system (ZFS).

16. The non-transitory computer-readable storage medium of claim 11 wherein the another set of transaction identifiers is a monotonically increasing set of transaction identifiers.

* * * * *